United States Patent
Okada

(10) Patent No.: US 8,175,983 B2
(45) Date of Patent: May 8, 2012

(54) PORTABLE COMMUNICATION DEVICE, IN-VEHICLE COMMUNICATION DEVICE, AND COMMUNICATION SYSTEM

(75) Inventor: Hiroki Okada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 769 days.

(21) Appl. No.: 12/277,828

(22) Filed: Nov. 25, 2008

(65) Prior Publication Data

US 2009/0150310 A1   Jun. 11, 2009

(30) Foreign Application Priority Data

Dec. 5, 2007  (JP) ................... 2007-315109

(51) Int. Cl.
*G06F 15/18* (2006.01)
(52) U.S. Cl. .......................................................... 706/12
(58) Field of Classification Search ............... 706/12; 455/142

See application file for complete search history.

(56) References Cited

U.S. PATENT DOCUMENTS

| 5,062,102 A | 10/1991 | Taguchi |
| 2007/0021082 A1 * | 1/2007 | Okumura et al. ............ 455/142 |

FOREIGN PATENT DOCUMENTS

| EP | 1 004 172 B1 | 5/2000 |
| JP | 2002-337521 | 11/2002 |
| JP | 2004-276849 | 10/2004 |
| JP | 2005-157511 | 6/2005 |
| JP | 2006-211151 | 8/2006 |
| JP | 2006-213289 | 8/2006 |
| JP | 2007-28276 | 2/2007 |

* cited by examiner

Primary Examiner — Jeffrey A Gaffin
Assistant Examiner — Ola Olude Afolabi
(74) Attorney, Agent, or Firm — Oblon, Spivak, McClelland, Maier & Neustadt, L.L.P.

(57) ABSTRACT

A communication system has: a portable communication device; and an in-vehicle communication device that communicates with the portable communication device through synchronous communication. The potable communication device transmits dummy signals simulating the vehicle information to the in-vehicle communication device in a first period. The in-vehicle communication device learns and records a first filter coefficient for filtering the dummy signals that are received in the first period and a second filter coefficient for filtering signals that are received from the sensors in a second period in which the portable communication device do not transmit the dummy signals, and the in-vehicle communication device calculates a third filter coefficient for removing noises on signals received from the sensors based on the first and second filter coefficients and then filters the received signals using the third filter coefficient.

20 Claims, 7 Drawing Sheets

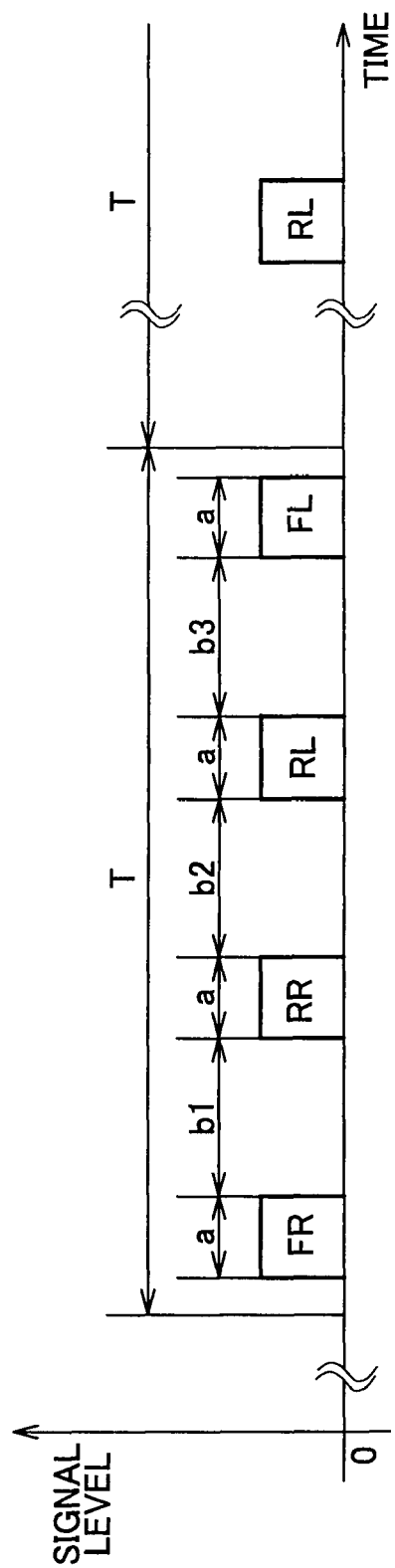

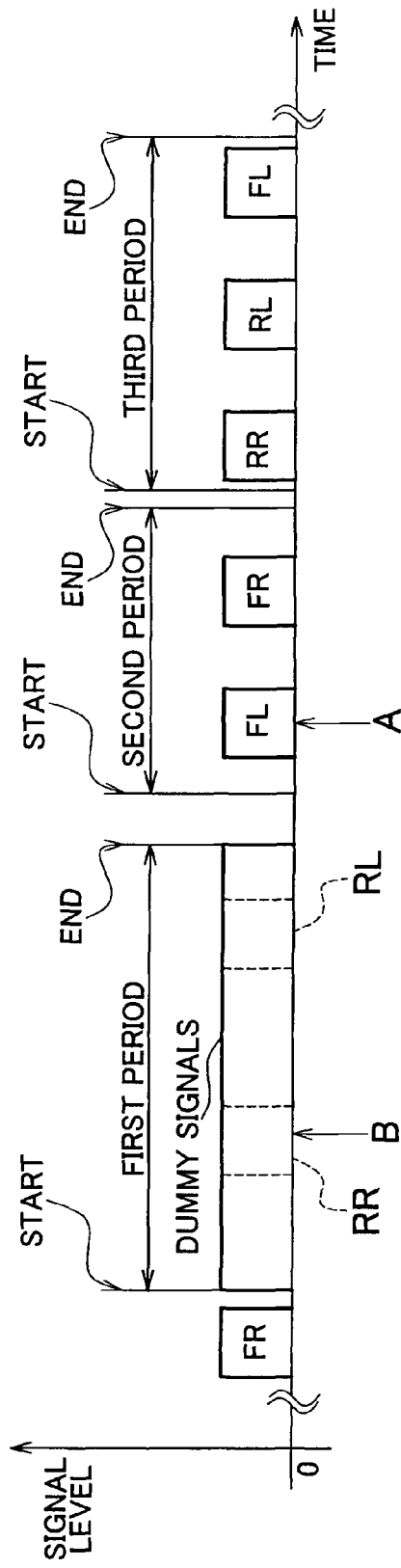

PORTABLE COMMUNICATION DEVICE, IN-VEHICLE COMMUNICATION DEVICE, AND COMMUNICATION SYSTEM

INCORPORATION BY REFERENCE

The disclosure of Japanese Patent Application No. 2007-315109 filed on Dec. 5, 2007, including the specification, drawings and abstract is incorporated herein by reference in its entirety.

BACKGROUND OF THE INVENTION

1. Field of the Invention

The invention relates to a portable communication device, an in-vehicle communication device, and a communication system incorporating said communication devices. In particular, the invention relates to processes for filtering the signals received by an in-vehicle communication device.

2. Description of the Related Art

In recent years, various technologies have been developed in which specific information on a vehicle (e.g., motor vehicle), such as information on the pressures of the tires of the vehicle, is regularly detected and the detected vehicle information is indicated to the driver or a warning is given to the driver based on the detected vehicle information while controlling the vehicle based on the detected vehicle information. As one example of such technologies, Japanese Patent Application Publication No. 2002-337521 (JP-A-2002-337521) describes a tire pressure estimation system. According to this system, the pressures of the tires are estimated from the rotation speeds of the wheels based on a specific relation between the resonance frequency of the wheel rotation speed and the tire pressure. However, external disturbances that are white noises are input to the tire-suspension system of the vehicle, resulting in noises on the signals carrying the information on the rotation speeds of the respective wheels of the vehicle. According to the technology of JP-A-2002-337521, therefore, it is necessary to remove the noises on the wheel speed signals when extracting the resonance frequency components used to estimate the tire pressures. For this reason, in the technology of JP-A-2002-337521, multiple filtering processes are executed using a plurality of filters having different cut-off frequencies, and the resonance frequency components are extracted based on the results of the filtering processes, and the tire pressures are estimated based on the resonance frequency components thus extracted.

According to the technology of JP-A-2002-337521, however, even if the resonance frequency components can be exclusively extracted, the obtained tire pressures are only estimated values, and therefore there is a possibility that the estimated tire pressures are different from the actual tire pressures.

On the other hand, in other example, tire pressure sensors are provided at the respective wheels of the vehicle to directly detect the pressures of the respective tires, and information regarding the detected tire pressures is transmitted to a receiver by radio. That is, in this case, sensors are provided at detection target objects for obtaining specific vehicle information, and the vehicle information directly obtained via the sensors is transmitted by radio.

Further, a technology is known which enables extracting target frequency components through only one filtering process, not multiple filtering processes. According to this technology, an adaptive filter that filters signals using a specific filter coefficient is used.

An adaptive filter filters input signals while continuously updating its filter coefficient so as to remove all the frequency components including noises from the input signals. Therefore, in a case where an adaptive filter is used to extract signals transmitted by radio and carrying specific vehicle information, such as tire pressures, the process for updating the filter coefficient of the adaptive filter needs to be suspended when extracting said vehicle information signals. If it is not suspend when extracting the vehicle information signals, it results in the filter coefficient of the adaptive filter being updated so as to remove also the vehicle information signals that should not be removed. To suspend the filter-coefficient updating process when extracting the vehicle information signals, for example, the filter-coefficient updating process may be suspended when the in-vehicle receiver detects that vehicle information signals have been received.

However, it is difficult to keep powering the sensors provided at the detection target objects in motion, which are, for example, tire pressure sensors provided at the respective tires. Therefore, in this case, for example, small batteries are provided at the respective tire pressure sensors to power them. However, because the amount of power supplied from each battery is very limited, and the power consumption of the sensors needs to be reduced. For example, the power consumption of each sensor may be reduced if the information on the detected tire pressure is regularly transmitted by radio at given time intervals, rather than being continuously transmitted. In this case, the power used to transmit the vehicle information signals to the in-vehicle receiver is relatively small.

In the above-described case, however, if the vehicle information signals are asynchronously transmitted from the respective sensors, which are provided at the detection target objects, by radio at given time intervals, that is, without being synchronized, there is a possibility, although small, that the signals are superimposed. If the in-vehicle receiver receives such superimposed signals, it can not accurately identify each vehicle information signal. In the above-described case, therefore, the process for updating the filter coefficient for the adaptive filter can not be suspended when superimposed signals are received, and as a result, the filter coefficient for the adaptive filter is updated so as to remove the superimposed signals from the signals received by the in-vehicle receiver, which is not desirable. If the in-vehicle receiver filters the received signals using the filter that removes superimposed signals, the vehicle information signals that are not superimposed are also removed.

SUMMARY OF THE INVENTION

The invention provides a communication system that enables reliably receiving vehicle information signals asynchronously transmitted by radio while removing noises.

The first aspect of the invention relates to a communication system that receives vehicle information asynchronously transmitted from a plurality of sensors provided in a vehicle. This communication system has: a portable communication device; and an in-vehicle communication device that communicates with the portable communication device through synchronous communication. The potable communication device transmits dummy signals simulating the vehicle information to the in-vehicle communication device in a first period. The in-vehicle communication device learns and records a first filter coefficient for filtering the dummy signals that are received in the first period and a second filter coefficient for filtering signals that are received from the sensors in a second period in which the portable communication device do not transmit the dummy signals, and the in-vehicle communication device calculates a third filter coefficient for removing noises on signals received from the sensors based on the first and second filter coefficients and then filters the received signals using the third filter coefficient.

According to the communication system described above, the third filter coefficient used to remove noises on the received signals is calculated based on the first filter coefficient that is learned in the period in which the dummy signals simulating the vehicle information asynchronously transmitted from the sensors are transmitted and the second filter coefficient that is learned in the period in which the dummy signals are not transmitted. As such, the communication system enables reliably receiving the vehicle information while removing noises.

The second aspect of the invention relates to an in-vehicle communication device that receives vehicle information asynchronously transmitted from a plurality of sensors provided in a vehicle and communicates with a portable communication device through synchronous communication. In this in-vehicle communication device, a first filter coefficient for filtering dummy signals simulating the vehicle information are received in a first period is learned and recorded, a second filter coefficient for filtering signals that are transmitted from the sensors in a second period in which the dummy signals are not received is learned and recorded, and a third filter coefficient for removing noises on signals received from the sensors is calculated based on the first and second filter coefficients and the received signals are filtered using the third filter coefficient.

The third aspect of the invention relates to a portable communication device that communicates with an in-vehicle communication device that receives vehicle information transmitted from a plurality of sensors provided in a vehicle. The portable communication device transmits dummy signals simulating the vehicle information in a predetermined period in which the in-vehicle communication device learns a filter coefficient for removing noises on received signals.

The fourth aspect of the invention relates to a communication system that receives vehicle information asynchronously transmitted from a plurality of sensors provided in a vehicle. This communication system has: a portable communication device; an in-vehicle communication device that communicates with the portable communication device through synchronous communication; and a dummy-signal generation portion that generates dummy signals simulating the vehicle information. The in-vehicle communication device receives the dummy signals from the dummy-signal generation portion in a first period after synchronously communicating with the portable communication device. The in-vehicle communication device learns and records a first filter coefficient for filtering the dummy signals that are received in the first period and a second filter coefficient for filtering signals that are received from the sensors in a second period in which the in-vehicle communication device do not receive the dummy signals. Then, the in-vehicle communication device calculates a third filter coefficient for removing noises on signals received from the sensors based on the first and second filter coefficients. Then, the in-vehicle communication device filters the received signals using the third filter coefficient.

BRIEF DESCRIPTION OF THE DRAWINGS

The foregoing and further features and advantages of the invention will become apparent from the following description of example embodiments with reference to the on drawings, wherein like numerals are used to represent like elements and wherein:

FIG. 3 is a timing chart illustrating the timing of transmission of vehicle information that is asynchronously transmitted;

FIG. 4 is a chart illustrating the first, second, and third periods;

DETAILED DESCRIPTION OF THE EMBODIMENTS

First Example Embodiment

Figure 1:
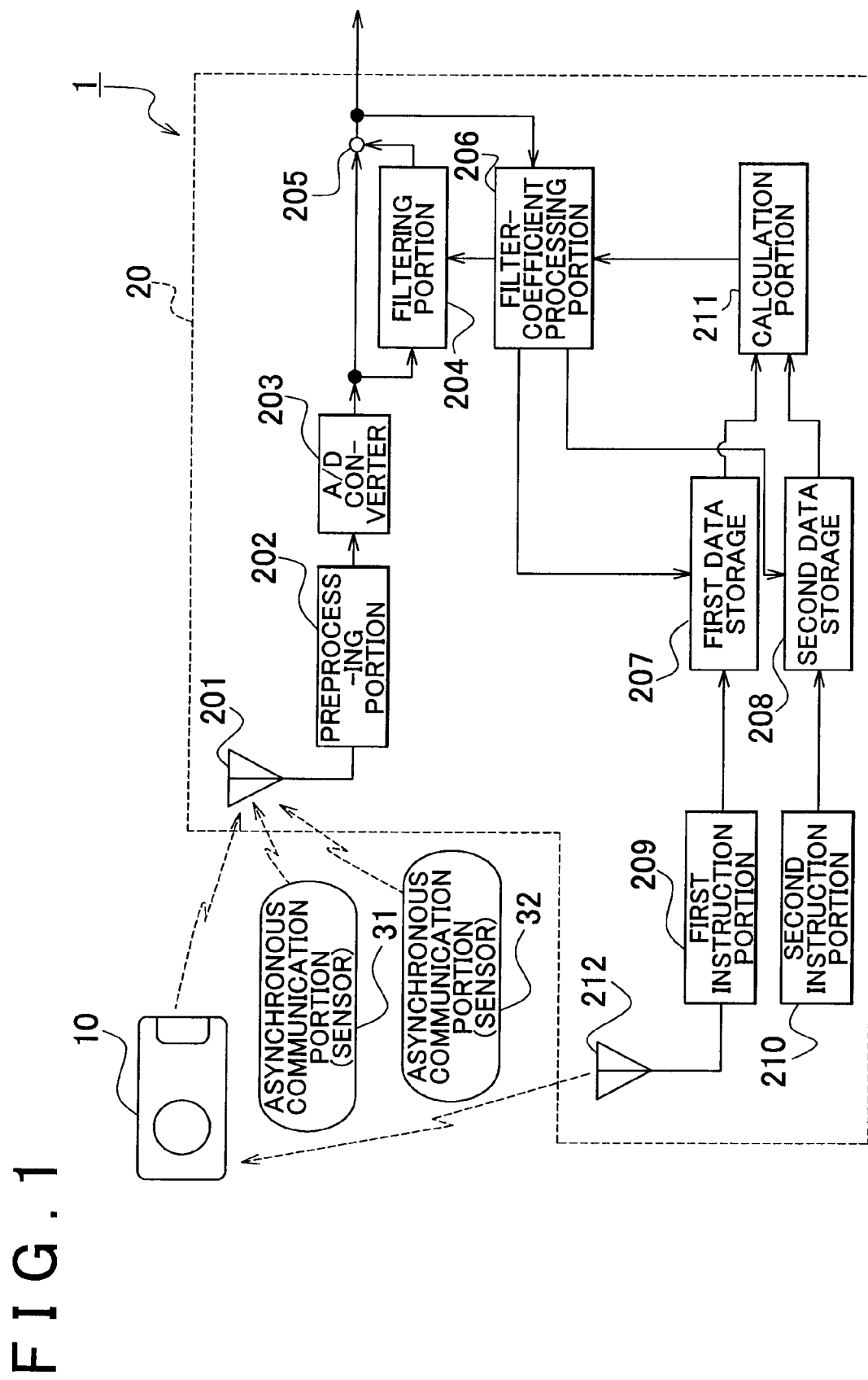
FIG. 1 is a block diagram schematically showing the configuration of a communication system according to the first example embodiment of the invention.

FIG. 1 is a block diagram schematically showing the configuration of a communication system 1 according to the first example embodiment of the invention. Referring to FIG. 1, the communication system 1 incorporates a potable communication device 10 and an in-vehicle communication device 20. The in-vehicle communication device 20 has a receiver portion 201, a preprocessing portion 202, an A/D converter 203, a filtering portion 204, a mixing portion 205, a filter-coefficient processing portion 206, a first data storage 207, a second data storage 208, a first instruction portion 209, a second instruction portion 210, a calculation portion 211, and an instruction transmission portion 212. The communication system 1 receives signals from asynchronous communication portions 31, 32 by radio.

The potable communication device 10 transmits dummy signals to the receiver portion 201 of the in-vehicle communication device 20 within a first period, which is a predetermined period, through synchronous communication. The dummy signals simulate the vehicle information signals transmitted from the asynchronous communication portions 31, 32.

The receiver portion 201 receives the dummy signals transmitted by radio from the potable communication device 10 and the vehicle information signals transmitted by radio from the asynchronous communication portions 31, 32.

The dummy signals may be generated by a dummy signals generation portion, which is not shown in the drawings, in accordance with synchronization signals for the potable communication device 10.

The preprocessing portion 202 executes preprocesses such as down-converting the signals received by the receiver portion 201 to middle-frequency signals.

The A/D converter 203 converts the signals preprocessed by the preprocessing portion 202 into digital signals.

The filtering portion 204 executes filtering processes using a filter coefficient for filtering the digital signals output from the A/D converter 203. For example, in the filtering process at the filtering portion 204, the digital signals output from the A/D converter 203 (i.e., the received signals in digital formats) are multiplied with the filter coefficient.

The mixing portion 205 mixes the digital signals output from the A/D converter 203 and the filtered digital signals output from the filtering portion 204 through addition or subtraction between them. The signal mixing at the mixing portion 205 removes signals specific to the filter coefficient for the filtering portion 204 from the received signals. As such, in the first example embodiment of the invention, the communication system 1 removes unnecessary signals from the signals received via the receiver portion 201 by filtering them by mixing the digital signals output from the A/D converter 203 and the filtered digital signals output from the filtering portion 204.

In the first period and the second period, the filter-coefficient processing portion 206 continuously updates the filter coefficient for the filtering portion 204 such that the signal levels of the received signals are all zeroed through the mixing at the mixing portion 205. In the third period, the filter-coefficient processing portion 206 updates the filter coefficient for the filtering portion 204 to a filter coefficient calculated by the calculation portion 211.

The first data storage 207 records the filter coefficient for the filtering portion 204 that is repeatedly updated (learned) by the filter-coefficient processing portion 206 in the first period in which the signals received by the receiver portion 201 include the dummy signals transmitted by radio from the potable communication device 10.

On the other hand, the second data storage 208 records the filter coefficient for the filtering portion 204 that is repeatedly updated (learned) by the filter-coefficient processing portion 206 in the second period in which the signals received by the receiver portion 201 do not include the dummy signals. The first period, the second period, and the third period will be described in detail later.

At the start of the first period, the first instruction portion 209 issues an instruction for the potable communication device 10 to start transmitting the dummy signals and an instruction for the first data storage 207 to start recording the filter coefficient for the filtering portion 204 that is repeatedly updated by the filter-coefficient processing portion 206. At the end of the first period, the first instruction portion 209 issues an instruction for the potable communication device 10 to stop transmitting the dummy signals.

On the other hand, at the start of the second period, the second instruction portion 210 issues an instruction for the second data storage 208 to start recording the filter coefficient for the filtering portion 204 that is repeatedly updated (learned) by the filter-coefficient processing portion 206. At the end of the second period, the second instruction portion 210 issues an instruction for the second data storage 208 to stop recording the filter coefficient for the filtering portion 204.

Then, based on the filter coefficient recorded in the first data storage 207 at the end of the first period and the filter coefficient recorded in the second data storage 208 at the end of the second period, the calculation portion 211 calculates a filter coefficient used for the filtering process at the filtering portion 204 so as to remove the noises on the signals received by the receiver portion 201, and then the calculation portion 211 issues an instruction for the filter-coefficient processing portion 206 to updates the filter coefficient for the filtering process at the filtering portion 204 to the newly calculated filter coefficient.

The above-described instructions are transmitted by radio from the first instruction portion 209 to the potable communication device 10 via the instruction transmission portion 212.

Referring to FIG. 1, the asynchronous communication portions 31, 32 transmit vehicle information signals indicative of specific information on the vehicle to the in-vehicle communication device 20 through asynchronous radio transmission. In the following, the asynchronous radio transmission regularly performed by the asynchronous communication portions 31, 32 will be simply referred to as "asynchronous transmission" if necessary.

While two asynchronous transmission portions, that is, the asynchronous communication portions 31, 32 are incorporated in the communication system 1 of the first example embodiment as shown in FIG. 1, the number of asynchronous transmission portions is not limited to two. The asynchronous transmission portions 31, 32 are, for example, sensors incorporated in a tire pressure monitoring system (TPMS) which detect the pressures of the corresponding tires and transmit signals indicative of the detected tire pressures as the aforementioned vehicle information signals. In this case, preferably, four asynchronous transmission portions are provided (when the number of the tires of the vehicle is four).

Figure 2:
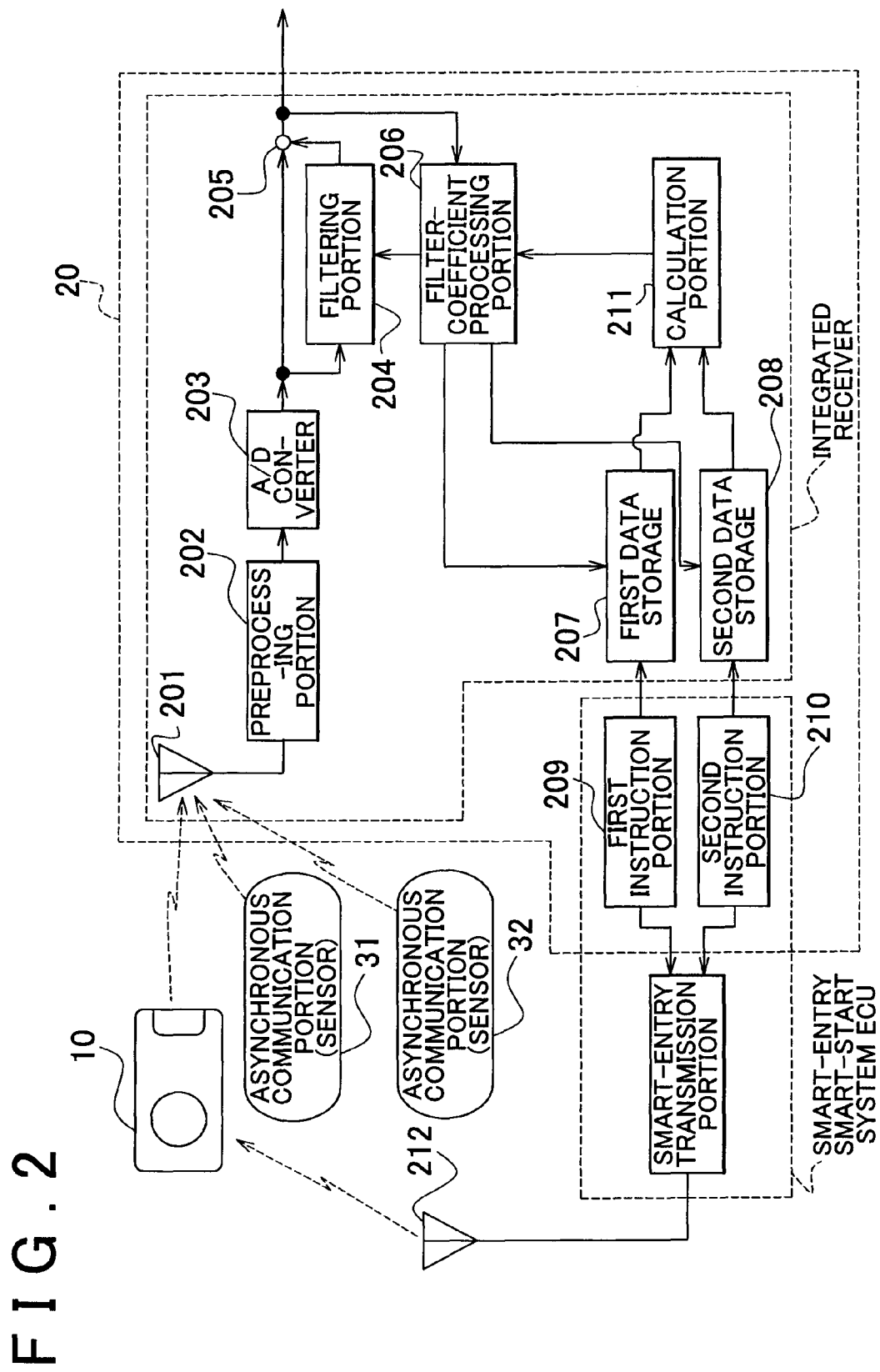
FIG. 2 is a block diagram schematically illustrating the configuration of the communication system when it is configured as part of a smart-entry and smart-start system.

Further, in the first example embodiment of the invention, the potable communication device 10 and the in-vehicle communication device 20 may be incorporated in as a smart-entry and smart-start system that is a synchronous communication system that, for example enables locking and unlocking the doors of the vehicle and starting the engine without using any mechanical key. FIG. 2 is a block diagram schematically illustrating the configuration of the communication system 1 when it is configured as part of a smart-entry and smart-start system with the potable communication device 10 and the in-vehicle communication device 20 described above.

A related-art smart-entry and smart-start system is configured such that various information is transmitted through bidirectional radio communications by an integrated receiver that receives radio signals for smart-entry and smart-start operations while synchronizing the actions of the portable communication device and the in-vehicle communication device. This means that a smart-entry and smart-start system ECU (Electronic Control Unit) of the smart-entry and smart-start system predetermines the time period from when the smart-entry and smart-start system ECU transmits radio signals carrying specific information to the portable communication device to when the radio signals carrying specific information that the portable communication device transmits back to the smart-entry and smart-start system ECU reach the in-vehicle communication device.

According to the first example embodiment of the invention, on the other hand, the first instruction portion 209 issues the instruction for the potable communication device 10 to start transmitting the dummy signals while outputting the instruction for the first data storage 207 to start recording the filter coefficient in accordance with the time point at which the potable communication device 10 starts transmitting the dummy signals, and the first instruction portion 209 also issues the instruction for the potable communication device 10 to stop transmitting the dummy signals while outputting the instruction for the first data storage 207 to stop recording the filter coefficient in accordance with the time point at which the potable communication device 10 stops transmitting the dummy signals, and the second instruction portion 210 issues the instruction for the second data storage 208 to stop recording the filter coefficient in accordance with the time point at which the potable communication device 10 stops transmitting the dummy signals. That is, in the first example embodiment of the invention, synchronization is performed by the first instruction portion 209 setting the time points to start and stop the sequential filter-coefficient recording by the first data storage 207 in accordance with the time points at which the portable communication device 10 starts and stop transmitting the dummy signals and by the second instruction portion 210 setting the time points to start and stop the sequential filter-coefficient recording by the second data storage 208 in accordance with the time point at which the portable communication device 10 starts and stop transmitting the dummy signals.

As such, among the functions of the first instruction portion 209 and the second instruction portion 210 of the in-vehicle communication device 20 of the first example embodiment of the invention, those equivalent to the functions of the smart-entry and smart-system ECU, such as the synchronization function, can be utilized as they are in the communication system 1 shown in FIG. 2.

This means that, according to the first example embodiment of the invention, the potable communication device 10 and the in-vehicle communication device 20 predetermine the time period from when the first instruction portion 209 transmits radio signals carrying certain information or instructions including those described above to the potable communication device 10 to when the radio signals carrying certain information or instructions including the dummy signals described above and transmitted back from the potable communication device 10 to the in-vehicle communication device 20 reach the in-vehicle communication device 20. Therefore, in the description on the first example embodiment of the invention, the processes for synchronizing the signal-receiving actions and the signal-transmitting actions of the potable communication device 10 and the in-vehicle communication device 20 are not described unless necessary. Thus, the communication system 1 of the first example embodiment of the invention can be obtained by applying only small structural modifications to a related-art smart-entry and smart-start system and therefore the production cost of the communication system 1 is low.

In a case where the communication system 1 is used as a portion of a related-art smart-entry and smart-start system as shown in FIG. 2, the first instruction portion 209 and the second instruction portion 210 may be incorporated in a control portion of the smart-entry and smart-start system ECU for controlling synchronous communication (not shown in the drawings), and other structural portions of the in-vehicle communication device 20 may be incorporated in the integrated receiver.

In this case, alternatively, the first instruction portion 209 and the second instruction portion 210 are not necessarily incorporated in the smart-entry and smart-start system ECU. That is, they may be incorporated in any other ECU if it is adapted to control the synchronous communication described above.

This has been the description on the communication system 1 and the asynchronous communication portions 31, 32. Next, the timings of asynchronous transmission of vehicle information signals from the asynchronous communication portions will be described by referring to an example where the asynchronous communication portions are provided in a tire pressure monitoring system, that is, where the communication system 1 receives vehicle information signals asynchronously transmitted from four asynchronous communication portions.

The timing chart of FIG. 3 illustrates the timing of transmission of the vehicle information signals that are asynchronously transmitted. The timing chart of FIG. 3 illustrates how the vehicle information signals are transmitted from the four asynchronous communication portions that are provided at the front-right wheel FR, the rear-right wheel RR, the rear-left wheel RL, and the front-left wheel FL of the vehicle, respectively. Hereinafter, the vehicle information signals transmitted from the four asynchronous communication portions provided at the wheels FR, RR, RL, and FL will be referred to as vehicle information signals FR, RR, RL, and FL, respectively.

The timing chart of FIG. 3 illustrates a cycle T of asynchronous transmissions of the vehicle information signals FR, RR, RL, FL. Referring to FIG. 3, each vehicle information signal FR, RR, RL, FL is transmitted for a duration a. In the cycle T, the vehicle information signals FR, RR, RL, FL are repeatedly transmitted at time intervals b1, b2, and b3. In the tire pressure monitoring system of this example, the cycle T of asynchronous transmissions of the four vehicle information signals FR, RR, RL, FL is repeated, whereby the vehicle information signals continue to be transmitted from the respective asynchronous communication portions. This has been the description on the transmission timing of the vehicle information signals transmitted from the asynchronous communication portions. Note that the length of each cycle T is typically set to approx. 1 min and the length of each duration a is set to, for example, 10 msec. Moreover, note that the lengths of the time intervals b1, b2, and b3 may be freely set as needed. That is, for example, they may be equal to each other or substantially equal to each other, or may be different from each other.

Referring to FIG. 3, the transmission timing of the vehicle information signals from each of the four asynchronous communication portions is set so that that their vehicle information signals are not continuously superimposed on each other. However, because the transmission actions of the respective asynchronous communication portions are not synchronized with each other, if the transmission intervals at each asynchronous communication portion change, it may cause signal superimpositions between the vehicle information signals transmitted from the respective asynchronous communication portions. If such superimposed vehicle information signals are received and used in updating the filter coefficient for the filtering portion 204 and the filtering process is performed using the filter coefficient thus updated, the non-superimposed vehicle information singles among the received vehicle information signals may be also removed as noises.

In view of this, in the first example embodiment of the invention, the communication system 1 is adapted to set a filter coefficient that enables the noises on the vehicle information signals received via the receiver portion 201 to be removed without removing the non-superimposed vehicle information signals among the received signals. To accomplish this, as described above, the communication system 1 repeatedly records the filter coefficient in the first and second periods and executes the filtering process using the filter coefficient calculated in the third period.

Next, the operations of the communication system 1 of the first example embodiment in the first, second and third periods and its operation procedure will be described with reference to FIG. 4. FIG. 4 illustrates the first, second, and third periods mentioned above. In the first period, the potable communication device 10 transmits the dummy signals. In the second period, the potable communication device 10 does not transmit the dummy signals. In the third period, the filtering process is executed using the filter coefficient calculated by the calculation portion 211.

FIG. 4 also indicates the transmission timings of the vehicle information signals FR, RR, RL, FL that are continuously transmitted as described above. Because the respective asynchronous communication portions are not controlled by the potable communication device 10 nor the in-vehicle communication device 20, the vehicle information signals FR, RR, RL, FL continue to be asynchronously transmitted throughout the first to third periods as described above. Note that FIG. 4 does not show the duration a, the time intervals b1 to b3, and the cycle T shown in FIG. 3.

In the communication system 1 of the first example embodiment of the invention, referring to FIG. 4, at the start of the first period, the first instruction portion 209 issues an instruction for the first data storage 207 to start recording the filter coefficient for the filtering portion 204 that is repeatedly updated by the filter-coefficient processing portion 206 and at the same time, issues an instruction for the potable communication device 10 to start transmitting the dummy signals.

The first data storage 207 starts recording the filter coefficient for the filtering portion 204 when receiving the recording-start instruction from the first instruction portion 209, and the potable communication device 10 starts transmitting the dummy signals when receiving the dummy-signal transmission start instruction from the first instruction portion 209.

Then, referring to FIG. 4, at the end of the first period, the first instruction portion 209 issues an instruction for the first data storage 207 to stop recording the filter coefficient for the filtering portion 204 that is repeatedly updated by the filter-coefficient processing portion 206, and at the same time, issues an instruction for the potable communication device 10 to stop transmitting the dummy signals.

The first data storage 207 stops recording the filter coefficient for the filtering portion 204 when receiving the recording-stop instruction from the first instruction portion 209, and the potable communication device 10 stops transmitting the dummy signals when receiving the dummy-signal transmission stop instruction from the first instruction portion 209. Note that the first instruction portion 209 may be adapted to detect the start of the first period using a timer (not shown in the drawings).

Then, referring to FIG. 4, at the start of the second period, the second instruction portion 210 issues an instruction for the second data storage 208 to start recording the filter coefficient for the filtering portion 204 that is continuously updated by the filter-coefficient processing portion 206. The second data storage 208 starts recording the filter coefficient for the filtering portion 204 when receiving the recording-start instruction from the second instruction portion 210.

Then, referring to FIG. 4, at the end of the second period, the second instruction portion 210 issues an instruction for the second data storage 208 to stop recording the filter coefficient for the filtering portion 204 that is repeatedly updated by the filter-coefficient processing portion 206. The second data storage 208 stops recording the filter coefficient for the filtering portion 204 when receiving the recording-stop instruction from the second instruction portion 210. Note that the second instruction portion 210 may be adapted to detect that the start of the second period has arrived when it is determined, through time count by a timer (not shown in the drawings), that a predetermined time has passed from the start of the first period or from the end of the first period.

After the first data storage 207 and the second data storage 208 have finished recording the filter coefficient updated (learned) in the first period and the filter coefficient updated (learned) in the second period, respectively, the calculation portion 211 calculates a filter coefficient based on the filter coefficient recorded in the first data storage 207 in the first period and the filter coefficient recorded in the second data storage 208 in the second period. Through this calculation, a filter coefficient is obtained which enables the noises on the signals received via the receiver portion 201 to be removed without removing the non-superimposed vehicle information signals among the received signals. After calculating the filter coefficient as described above, the calculation portion 211 issues an instruction for the filter-coefficient processing portion 206 to update the filter coefficient for the filtering portion 204 to the filter coefficient calculated by the calculation portion 211.

Then, at the start of the third period, the filtering portion 204 starts the filtering process using the filter coefficient calculated by the calculation portion 211 as described above. Note that the filter-coefficient processing portion 206 suspends the filter-coefficient recording in the third period. The filtering portion 204 may be adapted to use a timer to detect the start of the third period. In this case, for example, the filtering portion 204 may determine that the start of the third period has arrived when it is determined, through time count by a timer (not shown in the drawings), that a predetermined time has passed from any of the start of the first period, the end of the first period, the start of the second period, and the end of the second period.

This has been the description on the operation procedure of the communication system 1 of the first example embodiment of the invention. However, it is to be understood that, in reality, the noises on the signals received via the receiver portion 201 may change in time due to various factors. For this reason, the above-described operation procedure of the communication system 1, that is, the processes for updating (learning) and recording the filter coefficient in the first period, the processes for updating (learning) and recording the filter coefficient in the second period, and the filtering process using the filter coefficient calculated by the calculation portion 211 in the third period may be repeated at given time intervals. In this case, the communication system 1 can more accurately remove the noises that vary in time. Note that the length of the first period shown in FIG. 4 is set to, for example, 30 sec.

Meanwhile, the longest among the first to third periods may be the third period in which the filtering process is performed using the filter coefficient calculated by the calculation portion 211. This is desirable because the longer the third period, the longer the filtering can be performed using the filter coefficient calculated by the calculation portion 211, that is, the longer the above-described noise removal can be performed to the received vehicle information signals. That is, the first period and the second period may be made as short as possible relative to the third period.

As such, while the start of the second period is set to a time point after the end of the first period in the above example case for the description on the operation procedure of the communication system 1, the start of the second period may alternatively be set to the end of the first period or to a time point immediately after the end of the first period. That is, by doing so, the total of the first and second periods can be minimized.

Further, the filter coefficient previously recorded in the first data storage 207 may be used at the start of the first period, and the filter coefficient previously recorded in the second data storage 208 may be used at the start of the second period. That is, the filter coefficients previously recorded in the first data storage 207 and the second data storage 208 may be used as the initial values (initial learning values) of the filter coefficients for the first and second periods.

The previously recorded filter coefficients may be, for example, filter coefficients that have been determined based on the experiences of designers, users, or the like. As mentioned above, in the communication system 1 of the first example embodiment, preferably, the first to third periods are repeated at given time intervals. In this case, the filter coefficients recorded in the first data storage 207 and the second data storage 208 in the first and second periods in any previous cycle may be used as the initial values mentioned above.

By using the previously learned filter coefficients as the initial values for the first and second periods, it is possible to reduce the time taken for convergence of the filter coefficient provided that there are no significant differences between the state of noises at the previous learning and the state of noises at the present learning. That is, in this case, the calculation portion 211 can quickly set a filter coefficient that provides a higher learning effect (a higher accuracy in extracting the vehicle information signals) than when the filter-coefficient updating (learning) processes are started without using the initial values in the first and second periods.

In the above example case for the description on the operation procedure of the communication system 1, the calculation portion 211 calculates the filter coefficient based on the filter coefficient that was recorded to the first data storage 207 at a certain time point in the first period and the filter coefficient that was recorded to the second data storage 208 at a certain time point in the second period. However, preferably, the calculation portion 211 calculates the filter coefficient based on the filter coefficient that was recorded to the first data storage 207 at the end of the first period and the filter coefficient that was recorded to the second data storage 208 at the end of the second period. That is, the filter coefficients recorded at the ends of the first period and the second period, respectively, are of values that have been updated (learned) by the filter-coefficient processing portion 206 over the entire updating periods (i.e., the first and second periods), and therefore their learning effects are high.

Further, in the example case for the foregoing description on the operation procedure of the communication system 1, it is the end of the first period when the first instruction portion 209 issues the instruction for the potable communication device 10 to stop transmitting the dummy signals and the instruction for the first data storage 207 to stop recording the filter coefficient, and it is the end of the second period when the second instruction portion 210 issues the instruction for the second data storage 208 to stop recording the filter coefficient.

However, in the communication system 1 of the first example embodiment of the invention, the first period and the second period are both a predetermined period. Therefore, in the first example embodiment of the invention, the first instruction portion 209 and the second instruction portion 210 do not necessarily output the above-described instructions at the end of the first period and at the end of the second period, respectively. That is, for example, the first period may be set in the potable communication device 10 in advance. In this case, for example, the potable communication device 10 automatically stops transmitting the dummy signals when it is detected through time count by a timer (not shown in the drawings) that the first period has passed from when the potable communication device 10 received the instruction to start transmitting the dummy signals. Further, the first data storage 207 may automatically stop recording the filter coefficient when it is detected through time count by a timer (not shown in the drawings) that the first period has passed from when the first data storage 207 received the instruction to start recording the filter coefficient. In this case, further, the second data storage 208 may automatically stop recording the filter coefficient when it is detected through time count by a timer (not shown in the drawings) that the second period has passed from when the second data storage 208 received the instruction to start recording the filter coefficient. These arrangements effectively reduce the processing loads on the first instruction portion 209 and the second instruction portion 210.

Next, the filter coefficients recorded in the first data storage 207 and the second data storage 208 and the filter coefficient calculated by the calculation portion 211 will be described in detail.

Figure 5A:
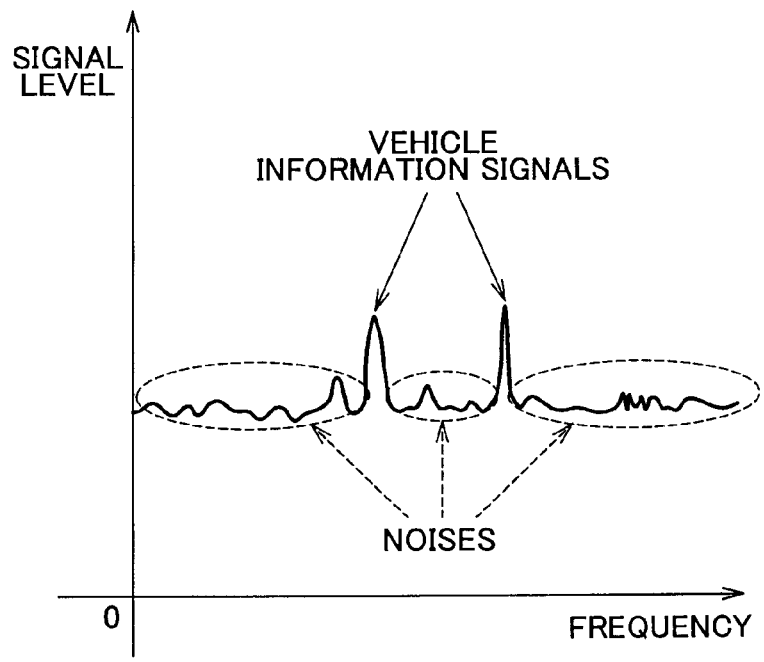
FIG. 5A is a graph illustrating the signal levels of the signals received in the second period.

The graph of FIG. 5A illustrates the signal levels of the signals received via the receiver portion 201 in the second period. More specifically, the graph of FIG. 5A illustrates the signals levels of the signals received at the time point A shown in FIG. 4. These signals include vehicle information signals and noises. As mentioned earlier, in the second period, the filter-coefficient processing portion 206 repeatedly updates the filter coefficient for the filtering portion 204 such that the signals levels of the received signals are all zeroed. More specifically, in the second period, the filter-coefficient processing portion 206 repeatedly updates the filter coefficient for the filtering portion 204 such that the signal levels of the vehicle information signals and noises included in the received signals are all zeroed. That is, the filter coefficient recorded to the second data storage 208 in the second period has a value that removes the vehicle information signals and noises from the signals received via the receiver portion 201. Therefore, if the filtering process is performed using only the filter coefficient recorded to the second data storage 208 in the second period, the receiver portion 201 removes the vehicle information signals from the signals received via the receiver portion 201 as well as the noises.

Figure 5B:
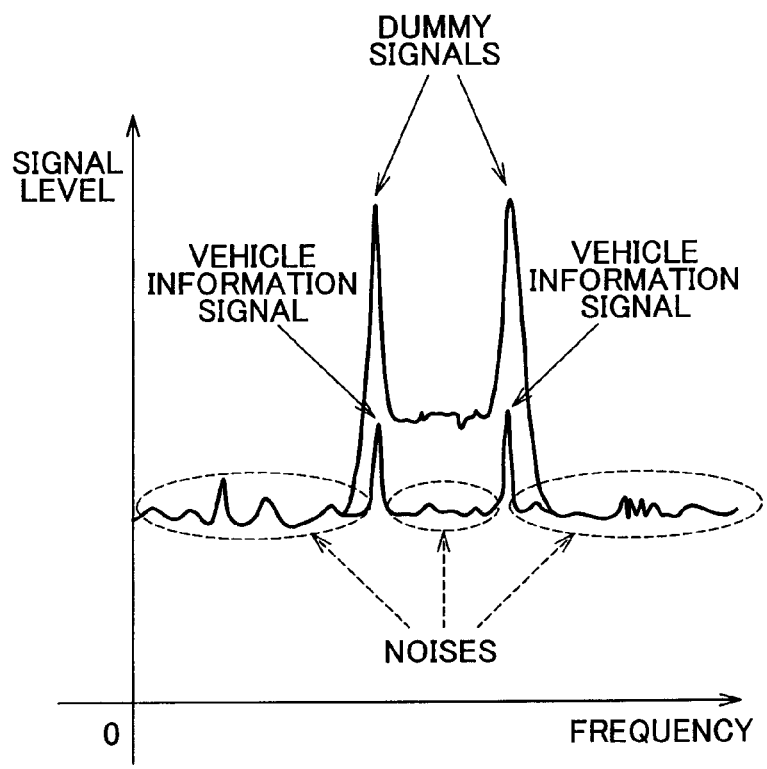
FIG. 5B is a graph illustrating the signal levels of the signals received in the first period.

On the other hand, the graph of FIG. 5B illustrates the signal levels of the signals received via the receiver portion 201 in the first period. More specifically, the graph of FIG. 5B illustrates the signals levels of the signals received at the time point B shown in FIG. 4. These signals include the dummy signals, the vehicle information signals, and noises. As mentioned earlier, in the first period, the filter-coefficient processing portion 206 repeatedly updates the filter coefficient for the filtering portion 204 such that the signals levels of the received signals are all zeroed. That is, in the first period, the filter-coefficient processing portion 206 repeatedly updates the filter coefficient for the filtering portion 204 such that the signal levels of the dummy signals, the vehicle information signals, and the noises included in the received signals are all zeroed.

At this time, if the signal levels of the dummy signals are substantially equal to the signals levels of the vehicle information signals and the noises, the filter coefficient recorded to the first data storage 207 in the first period has a value that zeros the signals levels of the dummy signals, the vehicle information signals, and the noises included in the signals received via the receiver portion 201 and thus removes them. On the other hand, if the signal levels of the dummy signals are sufficiently higher than the signal levels of the vehicle information signals and the noises as shown in FIG. 5B, the filter coefficient recorded to the first data storage 207 in the first period has a value that provides a higher effect of removing the dummy signals. That is, if the signal levels of the dummy signals included in the signals received via the receiver portion 201 are sufficiently higher than the signal levels of the vehicle information signals and the noises included in said received signals, the filter coefficient that is recoded to the first data storage 207 in the first period has a value reflecting the characteristics of the dummy signals, and therefore the influences of the vehicle information signals on the filter coefficient that is repeatedly updated as described above are eliminated.

As such, if the calculation portion 211 calculates a filter coefficient from the filter coefficient that is updated (learned) so as to remove the vehicle information signals and the noises from the signals received via the receiver portion 201 and then recorded in the second data storage 208 in the second period and the filter coefficient that is updated (learned) so as to reflect the characteristics of the dummy signals and then recorded in the first data storage 207 in the first period, the dummy signals can be extracted while removing the noises by using the filter coefficient calculated by the calculation portion 211. Because the dummy signals are, as mentioned earlier, simulate the vehicle information signals transmitted from the respective asynchronous communication portions, the filter coefficient calculated by the calculation portion 211, as a result, enables extracting the vehicle information signals from the signals received via the receiver portion 201 while removing the noises included in the received signals.

This has been the description on the filter coefficients recoded to the first data storage 207 and the second data storage 208 and the filter coefficient calculated by the calculation portion 211.

Meanwhile, the higher the signal levels of the dummy signals are than the signal levels of the vehicle information signals and the noises included in the signals received via the receiver portion 201, the higher the accuracy in removing signals other than the vehicle information signals from the received signals in the third period. Thus, the first instruction portion 209 may be adapted to output the instruction for the potable communication device 10 to start transmitting the dummy signals and the instruction for the first data storage 207 to start recording the filter coefficient when the potable communication device 10 is in the vehicle incorporating the in-vehicle communication device 20.

Figure 6:
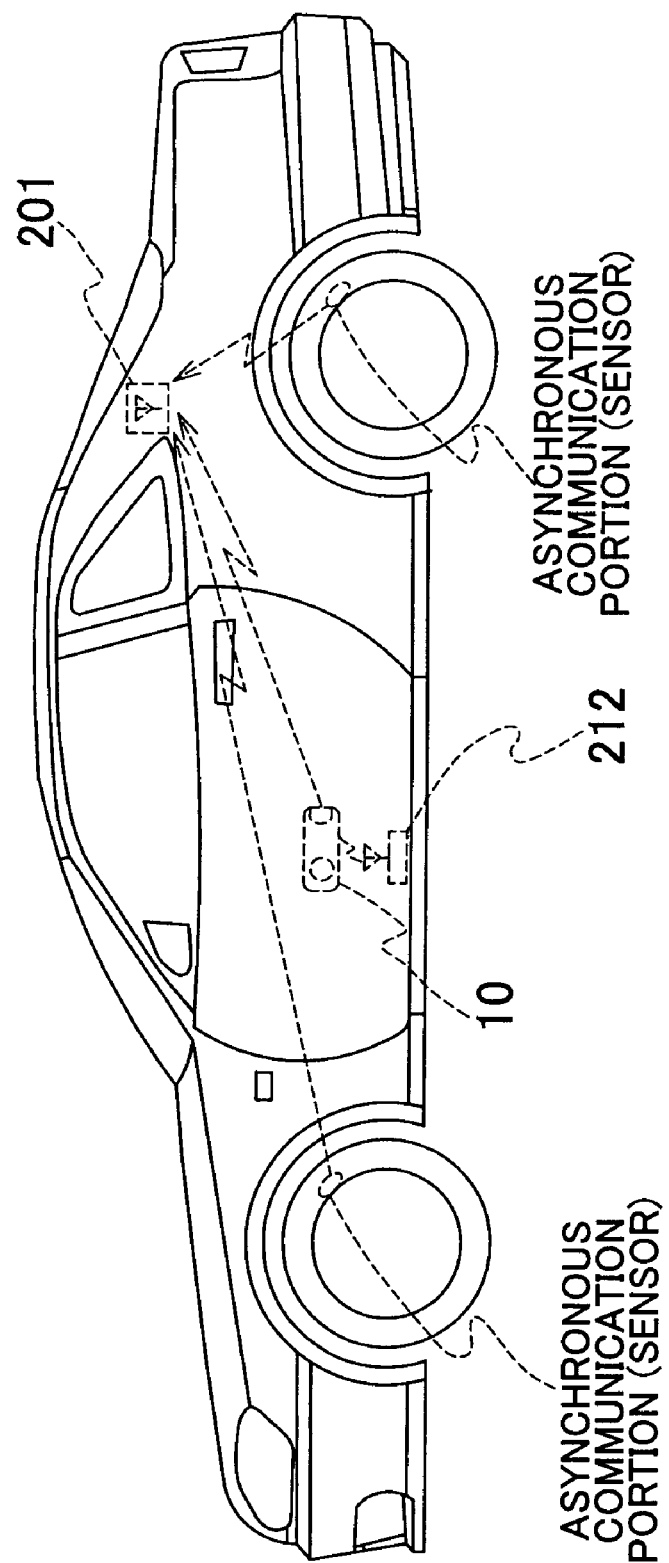
FIG. 6 shows a mounted position of a receiver portion on the vehicle.

That is, for example, in a case where the receiver portion 201 of the in-vehicle communication device 20 is used as or incorporated in an integrated receiver of a smart-entry and smart-start system that is mounted in a vehicle to receive various radio signals, etc., the integrated receiver is often arranged at a position close to where the potable communication device 10 is typically placed when it is in the vehicle (e.g., near one of the rear pillars (C-pillars)) as shown in FIG. 6. In such a case, the signal levels of the dummy signals included in the signals received via the receiver portion 201 are relatively high. Meanwhile, whether the potable communication device 10 is presently in the vehicle or not may be determined in various methods. For example, the potable communication device 10 may be determined to be presently in the vehicle if it is detected, via a given detector or the like, that the ignition switch of the vehicle is presently on.

Modification Example of First Example Embodiment

In the communication system 1 of the first example embodiment, the above-described operation procedure is repeated at given time intervals, and even if the operation procedure is thus repeated, the vehicle information signals can be reliably received while removing the noises. However, in the communication system 1, the filter coefficient is updated and recorded in the first period and the second period, and therefore the filtering process with the filter coefficient calculated by the calculation portion 211 can not be performed in the first period and the second period. Thus, in the communication system 1 of the first example embodiment, it is unavoidable to suspend the filtering process in some periods.

Figure 7:
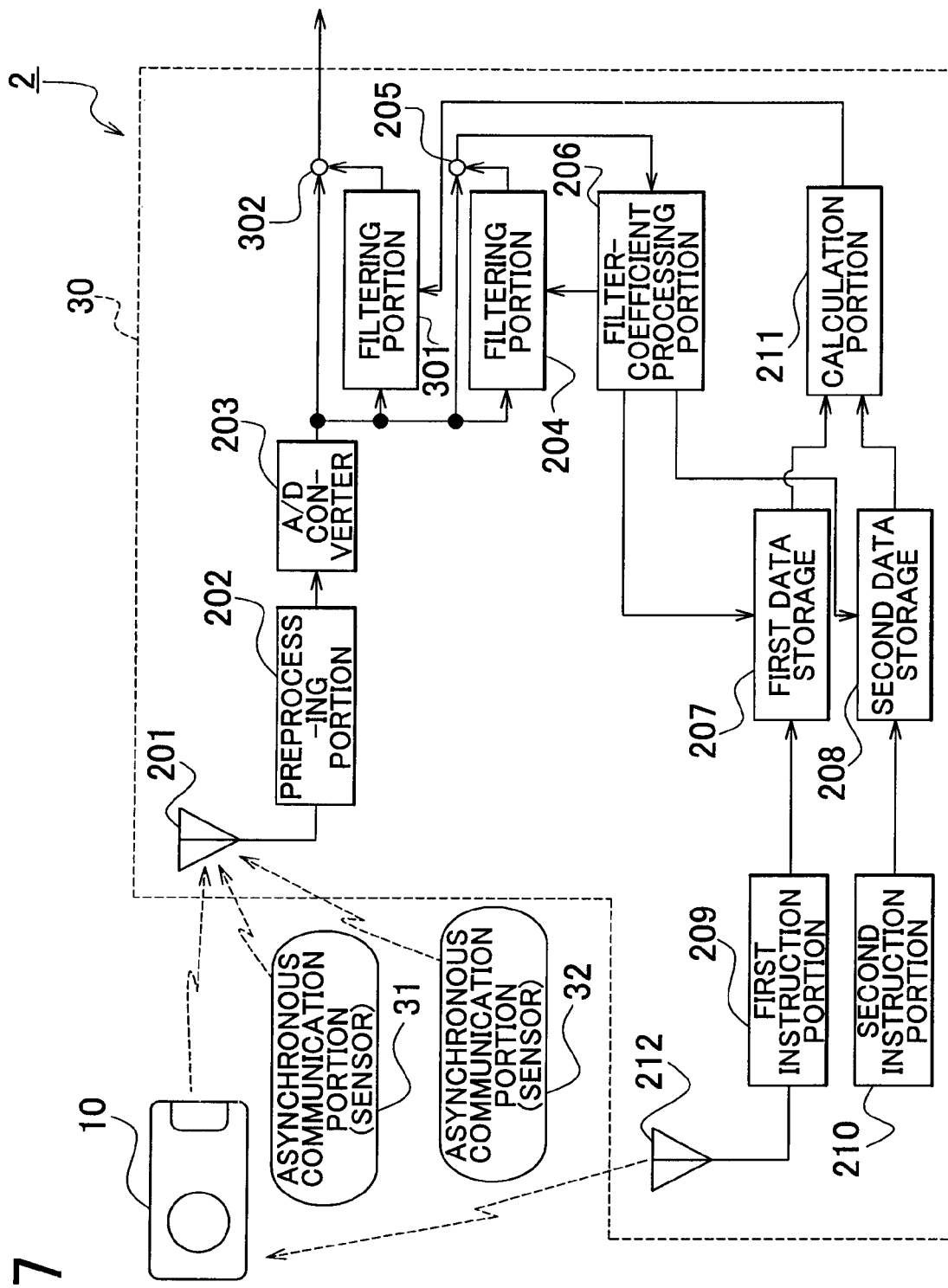
FIG. 7 is a block diagram schematically showing the configuration of a modified version of the communication system of the first example embodiment.

The block diagram of FIG. 7 schematically shows the configuration of a communication system 2 that is a modified version of the communication system 1 of the first example embodiment. The communication system 2 is configured such that the filtering process with the filter coefficient calculated by the calculation portion 211 can be always performed. In FIG. 7, the components and parts identical to those of the communication system 1 of the first example embodiment are denoted by the same reference numerals, and they are not described again.

The communication system 2 has a filtering portion 301 that always performs a filtering process using the filter coefficient calculated by the calculation portion 211 and a mixing portion 302 that mixes the digital signals output from the A/D converter 203 and the filtered digital signals output from the filtering portion 301 through addition or subtraction between them.

Among the components of the communication system 2, the components identical to those of the communication system 1 repeat the above-described operations for the first and second periods and do not perform the above-described operations for the third period. That is, in the communication system 2, the filter-coefficient processing portion 206 always updates (learns) the filter coefficient for the filtering portion 204, and the first data storage 207 and the second data storage 208 record the filter coefficient thus updated by the filter-coefficient processing portion 206, and the calculation portion 211 calculates the filter coefficient based on the filter coefficients recorded in the first data storage 207 and the second data storage 208 each time the process for recording said filter coefficients to the first data storage 207 and the second data storage 208 is finished.

The filter coefficient for the filtering portion 301 is updated each time the filter coefficient is calculated by the calculation portion 211. Therefore, the filtering portion 301 can always perform the filtering process using the filtering coefficient calculated by the calculation portion 211. That is, in the communication system 2 that is the modified version of the communication system 1 of the first example embodiment, due to the additional filtering portion 301 and the additional mixing portion 302, the process for recording (learning) the filter coefficient and the filtering process with the filter coefficient calculated by the calculation portion 211 can be always performed in parallel. As such, as compared to the communication system 1 of the first example embodiment, the communication system 2 can more quickly update the filter coefficient against the noises that vary in time.

The communication system 2 may be incorporated in a smart-entry and smart-start system as shown in FIG. 2.

Further, the systems shown in FIG. 2 and FIG. 7 may each be provided as a single integrated circuit or only part of them may be provided as a single integrated circuit. Further, the above-described operation procedure may be accomplished by the respective components shown in FIG. 1, FIG. 2, and FIG. 7 operating in accordance with instructions from a controller (not shown in the drawings) that is, for example, a CPU that operates on various programs stored in storage mediums such as ROMs and RAMs known in the art.

According to the invention, as such, it is possible to reliably receive the vehicle information signals transmitted through asynchronous radio transmission while removing noises. Thus, for example, the invention can be advantageously embodied as a communication system incorporated in vehicles, such as motor vehicles.

While the invention has been described with reference to example embodiments thereof, it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A communication system that receives vehicle information asynchronously transmitted from a plurality of sensors provided in a vehicle, comprising:
a portable communication device; and
an in-vehicle communication device that communicates with the portable communication device through synchronous communication, wherein
the potable communication device transmits dummy signals simulating the vehicle information to the in-vehicle communication device in a first period, and
the in-vehicle communication device learns and records a first filter coefficient to filter signals including the vehicle information, noise and the dummy signals, that are received in the first period, to zero signal levels of signals received in the first period,
learns and records a second filter coefficient to filter signals including the vehicle information and noise, that are received from the sensors in a second period in which the portable communication device does not transmit the dummy signals, to zero signal levels of signals received in the second period, and
calculates a third filter coefficient based on the first and second filter coefficients to filter signals including the vehicle information and noise, received from the sensors in a third period, using the third filter coefficient to remove the noise in the signals received from the sensors, the vehicle information being output without the noise.

2. The communication system according to claim 1, wherein
the in-vehicle communication device issues an instruction for the portable communication device to start transmitting the dummy signals and starts learning the first filter coefficient when the portable communication device is in the vehicle.

3. The communication system according to claim 1, wherein
the in-vehicle communication device issues an instruction for the portable communication device to stop transmitting the dummy signals and starts learning the second filter coefficient when the first period has passed.

4. The communication system according to claim 3, wherein the in-vehicle communication device issues an instruction to the portable communication device to stop transmission of the dummy signals upon expiration of a predetermined timer relative to issuance of the instruction to start transmission of the dummy signals.

5. The communication system according to claim 1, wherein
the in-vehicle communication device calculates the third filter coefficient based on the first filter coefficient recorded at the end of the first period and the second filter coefficient recorded at the end of the second period.

6. The communication system according to claim 1, wherein
the portable communication device and the in-vehicle communication device are incorporated in a smart-entry and smart-start system.

7. The communication system according to claim 1, wherein the sensors transmit, as the vehicle information, information regarding the pressures of tires of the vehicle.

8. The communication system according to claim 1, wherein
the in-vehicle communication device uses a filter coefficient recorded at the end of the first period as the first filter coefficient and uses a filter coefficient recorded at the end of the second period as the second filter coefficient.

9. The communication system according to claim 1, wherein the dummy signals have a higher level than the vehicle information.

10. The communication system according to claim 1, wherein calculating the third filter coefficient based on the first and second filter coefficients is performed in parallel with learning and recording the first and second filter coefficients.

11. An in-vehicle communication device that receives vehicle information asynchronously transmitted from a plurality of sensors provided in a vehicle and communicates with a portable communication device through synchronous communication, wherein
a first filter coefficient to filter signals received in a first period and including the vehicle information, noise and dummy signals is learned and recorded, the dummy signals simulating the vehicle information,
a second filter coefficient to filter signals that are transmitted from the sensors in a second period in which the dummy signals are not received is learned and recorded, the signals transmitted from the sensors in the second period including the vehicle information and noise and
a third filter coefficient is calculated based on the first and second filter coefficients to remove the noise from signals including the vehicle information and the noise which are transmitted from the sensors in a third period, the vehicle information being outputted without the noise.

12. The in-vehicle communication device according to claim 11, wherein
an instruction for the portable communication device to start transmitting the dummy signals is issued and the first filter coefficient starts to be learned when the portable communication device is in the vehicle.

13. The in-vehicle communication device according to claim 11, wherein
an instruction for the portable communication device to stop transmitting the dummy signals is issued and the second filter coefficient starts to be learned when the first period has passed.

14. The in-vehicle communication device according to claim 11, wherein
the third filter coefficient is calculated based on the first filter coefficient recorded at the end of the first period and the second filter coefficient recorded at the end of the second period.

15. The in-vehicle communication device according to claim 11, wherein
the in-vehicle communication device is incorporated in a smart-entry and smart-start system.

16. The in-vehicle communication device according to claim 11, wherein the sensors transmit, as the vehicle information, information regarding the pressures of tires of the vehicle.

17. The in-vehicle communication device according to claim 11, wherein a filter coefficient recorded at the end of the first period is used as the first filter coefficient and a filter coefficient recorded at the end of the second period is used as the second filter coefficient.

18. A portable communication device that communicates with an in-vehicle communication device that receives vehicle information transmitted from a plurality of sensors provided in a vehicle, wherein
the portable communication device transmits dummy signals simulating the vehicle information in a predetermined period in which the in-vehicle communication device learns a filter coefficient to zero a level of the dummy signal and noise to remove the noise on received signals.

19. The portable communication device according to claim 18, wherein
the portable communication device is incorporated in a smart-entry and smart-start system.

20. A communication system that receives vehicle information asynchronously transmitted from a plurality of sensors provided in a vehicle, comprising:
a portable communication device;
an in-vehicle communication device that communicates with the portable communication device through synchronous communication; and
a dummy-signal generation portion that generates dummy signals simulating the vehicle information, wherein
the in-vehicle communication device receives the dummy signals from the dummy-signal generation portion in a first period after synchronously communicating with the portable communication device,
the in-vehicle communication device learns and records a first filter coefficient to filter signals including the vehicle information, noise and the dummy signals, that are received in the first period, to zero a level of the signals,
learns and records a second filter coefficient to filter signals that are received from the sensors in a second period in which the in-vehicle communication device does not receive the dummy signals, to zero signal levels of signals received in the second period, and
calculates a third filter coefficient based on the first and second filter coefficients to filter signals including the vehicle information and the noise, received from the sensors in a third period, and
filters the received signals using the third filter coefficient to remove the noise from the received signals and to output the vehicle information without the noise.

* * * * *